Patented Aug. 28, 1945

2,383,782

UNITED STATES PATENT OFFICE 2,383,782

PRODUCTION OF RUBBERLIKE COPOLYMERS OF DIOLEFINS AND UNSATURATED KETONES

Robert R. Dreisbach, Midland, Mich., assignor to The Dow Chemical Company, Midland, Mich., a corporation of Michigan No Drawing. Application February 18, 1942, Serial No. 431,332

10 Claims. (Cl. 260—63)

This invention concerns an improved method of copolymerizing conjugated diolefins and unsaturated ketones having the general formula:

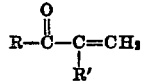

wherein R represents a monovalent hydrocarbon radical and R' represents hydrogen or an alkyl radical, together if desired with other polymerizable organic compounds, to obtain rubber-like products.

The formation of synthetic rubbers by copolymerizing diolefins and unsaturated ketones is disclosed in U. S. Patent No. 1,901,354, wherein it is shown that the polymerization may be effected by prolonged heating of a mixture of the polymerizable compounds, either directly or in an aqueous emulsion which may contain any of a number of emulsifying agents such as soaps, alkyl-naphthalene sulphonic acids, etc., and also a polymerization catalyst such as oxygen or compounds which form oxygen during use in the process. The examples of the patent show that under the reaction conditions disclosed, from several days to three weeks of heating were required in order to complete the copolymerization and obtain the copolymeric product in good yield. The patent includes general statements indicating that the products were of good quality, but does not include actual data as to the strength, elasticity, softness, or other properties of the products.

In my researches on the preparation of synthetic rubbers I have found that the rate and completeness with which a copolymerization may be carried out and also the properties of the polymerized product are dependent to a large extent upon the kinds of compounds which are to be copolymerized and the conditions under which the polymerization is carried out. For instance, I have found that the auxiliary agents, e. g. emulsifiers and polymerization catalysts, which are best adapted for the copolymerization of a conjugated diolefin and styrene in aqueous emulsion are poorly suited to the copolymerization of a mixture of a diolefin and an unsaturated ketone even though styrene be present, and vice versa. More particularly, I have found that the kind of emulsifying agent and of polymerization catalyst employed influence greatly the rate and completeness with which mixtures of polymerizable compounds including a conjugated diolefin and an unsaturated ketone may be polymerized in aqueous emulsion and that these reaction conditions also influence the properties, especially the hardness, of the polymeric product when vulcanized.

Of the considerable number and variety of polymerization catalysts which I have tested for the copolymerization of organic mixtures comprising a diolefin and an unsaturated ketone, persulphates such as ammonium persulphate, potassium persulphate, and sodium persulphate, have proven to be most effective. However, even when using a persulphate as the polymerization catalyst, many emulsifying agents, when also employed, permit the polymerization to occur only sluggishly at the usual reaction temperature of about 60° C. so that prolonged heating of the emulsion, e. g. for 5 days or longer, is required in order to obtain the polymer in even fair yield. I have found a few emulsifying agents which when used individually in conjunction with a persulphate catalyst would cause the copolymerization to occur almost completely in less than one day, but in these instances the polymerized product when compounded and cured, was too hard for many of the uses to which it is otherwise adapted. In many instances the emulsified reaction mixture was converted by the reaction into a rubber-like mass or gel which could not conveniently be removed from the reactor. However, I have found that the copolymerization of conjugated diolefins and unsaturated ketones having the hereinbefore-mentioned general formula, together if desired with other polymerizable compounds, may be accomplished quite rapidly and nearly completely to obtain rubber-like products of satisfactory softness by carrying out the copolymerization in aqueous emulsion using a persulphate as the polymerization catalyst and a mixture of certain emulsifying agents in the proportions hereinafter stated in preparing the emulsion. By employing such catalyst and mixture of emulsifying agents, the copolymerization may be carried out at 60° C. in less than 24 hours to obtain the copolymeric product in exceptionally high yield, e. g. usually in a yield of 90 per cent of theoretical or higher and in many instances in nearly quantitative yield. At the close of the polymerization reaction the product is for the most part retained in the form of a liquid aqueous emulsion thereof, although a portion of the polymer sometimes coagulates as a button during the reaction.

The mixture of emulsifying agents required by the invention consists of between 1.4 and 3, preferably about 2, parts by weight of Aquarex-D (i. e. the monosodium sulphate esters of a mixture of higher aliphatic alcohols consisting principally of lauryl and myristic alcohols), between 1.4 and 3, preferably about 2 parts of Santomerse No. 3 (i. e. an alkali metal salt of dodecyl benzene sulphonic acid) and 1 part of at least one other sulphuric acid ester of a higher aliphatic alcohol e. g. an alcohol containing 9 or more carbon atoms in the molecule, such as the emulsifying agents marketed under the names of Aliphatic Ester Sulphate (i. e. an emulsifying agent which is defined in the literature as "oil ester sulphate" and which analysis indicate to consist principally of sulphuric acid di-esters such as are obtainable by the reaction between sulphuric acid and the unsaturated hydrocarbons present in the higher fractions of petroleum), Duponol 80 (defined in the literature as "long-chain alcohol sulphate" and analyzing as the alkali metal salts of sulphuric mono-esters of long-chain aliphatic alcohols such as lauryl alcohol), and Duponol OS (alkali metal salts of suphuric acid mono-esters of long chain aliphatic alcohols). A mixture of Aquarex D, Santomerse No. 3, and Aliphatic Ester Sulphate in the proportions just given has proven to be most effective and is preferred.

The emulsifying agents are dissolved in water to form a solution containing a total of between 1 and 4 per cent, preferably between 2 and 2.5 per cent by weight thereof. In practice the solution is usually prepared so as to contain between 0.8 and 0.9 per cent of Santomerse No. 3, between 0.8 and 0.9 per cent of Aquarex D, and between 0.4 and 0.6 per cent of Aliphatic Ester Sulphate. An alkali persulphate such as ammonium or sodium or potassium persulphate is added in small proportion, e. g. in amount corresponding to between 0.1 and 0.2 and preferably about 0.15 per cent by weight. Also an alkali or an alkaline-reacting buffering agent, e. g. ammonia or a hydroxide, carbonate, or alkaline phosphate of ammonia, sodium or potassium, is added in amount sufficient to give the solution a pH value above 7, e. g. between 7.5 and 12 and preferably between 8 and 9. It will be understood that the emulsifying agents, persulphate catalyst, and the alkaline agent may be added together or in any desired order in forming the aqueous solution. If desired, any or all of these agents may be added together with the organic compounds to be copolymerized or after admixing the polymerizable compounds and the water.

The mixture of organic compounds to be copolymerized in accordance with the invention comprises a conjugated diolefin and an unsaturated ketone having the general formula hereinbefore specified and may also contain a minor amount of one or more other polymerizable organic compounds such as styrene, para-chlorostyrene, alpha-methyl-styrene, ortho-methyl-styrene, para-methyl-styrene, meta-ethyl-styrene, para-isopropyl-styrene, vinyl cyanide, alpha-methyl-vinyl cyanide, vinyl chloride, vinyl bromide, etc. Examples of conjugated diolefins which may be employed in the process are butadiene-1.3, isoprene, 2.3-dimethyl-butadiene-1.3, 2-ethyl-butadiene-1.3, etc. Examples of suitable unsaturated ketone reactants are methyl vinyl ketone, phenyl vinyl ketone, methyl isopropenyl ketone, ethyl vinyl ketone, ethyl isopropenyl ketone, etc. The invention may be applied with particular advantage in producing rubber-like copolymers of butadiene-1.3, methyl isopropenyl ketone and vinyl cyanide.

In order to obtain rubber-like products of good quality the conjugated diolefin is employed in a proportion corresponding to between 35 and 60 per cent of the combined weight of the polymerizable compounds and the unsaturated ketone is employed in amount between 5 and 60 per cent of the combined weight of the polymerizable compounds. Other polymerizable organic compounds such as styrene or vinyl cyanide, etc., when employed are used in amount corresponding to between 5 and 35 per cent of the combined weight of the polymerizable compounds.

In preparing the rubber-like products a total of between 8 and 16, preferably between 11 and 14, parts by weight of the polymerizable compounds just named is admixed with 20 parts of the alkaline aqueous solution of the emulsifying agents and persulphate catalyst hereinbefore described and the mixture is agitated to effect emulsification. It is then agitated in a closed reactor with sufficient agitation to prevent separation of the organic reactants from the mixture while maintaining the latter at a usual polymerizing temperature. The polymerization is usually carried out at temperatures between 40° and 80° C., preferably between 55° and 65° C.

By carrying out the polymerization at the usual temperature of 60° C. under the conditions just described, 90 per cent or more of the mixture of organic reactants may be polymerized in less than 24 hours and in some instances the copolymerization has been carried out almost quantitatively in only 4 hours. The copolymeric products obtained by this method are recovered from the emulsion in usual ways, e. g. by evaporation or by adding any of a variety of well known agents to cause coagulation. The products may be compounded with usual rubber-compounding agents, e. g. carbon black, fillers, vulcanizers and accelerators, etc., and be cured to obtain vulcanized rubber-like products which are sufficiently soft and flexible for most purposes. If desired the products may of course be softened further by vulcanizing them in the presence of a plasticizer. It may be mentioned that for most purposes the Shore durometer hardness of the cured but unplasticized rubber-like products is advantageously less than 83 and preferably not higher than 80. The other properties of the products obtained by the present method, e. g. the tensile strength, elasticity, etc., compare favorably with those of similar products made by other polymerization methods and are satisfactory for most purposes.

The following examples describe a number of ways in which the principle of the invention has been applied, but are not to be construed as limiting its scope.

EXAMPLE 1

The following Table I shows the results obtained in a series of experiments on the polymerization in aqueous emulsion of a mixture of polymerizable compounds consisting of 40 per cent by weight of butadiene-1.3, 45 per cent of methyl isopropenyl ketone and 15 per cent of vinyl cyanide and illustrates the sharp changes in the results obtained which follow from change in the kind of emulsifying agent employed. The table includes runs wherein the mixture of emulsifying agents required by the invention was employed and, for purpose of comparison, other runs wherein only certain of these emulsifying agents or else other emulsifying agents were used. In each experiment 4 parts by weight of the mixture of butadiene, methyl isopropenyl ketone, and vinyl cyanide was added to 5 parts of an aqueous solution which contained the emulsifying agent or agents stated, each in the per cent by weight given, and also contained 0.15 per cent by weight of potassium persulphate and sufficient sodium bicarbonate to bring the entire mixture to a pH value between 8 and 9. The mixture was agitated to effect emulsification and was thereafter heated to 60° C. in a closed container with moderate stirring and without access of light for the time stated. The container was then opened and water was evaporated from the emulsion at about 70° C. The residual rubbery material was heated to 100° C. under vacuum, i. e. at a final pressure of about 20 millimeters, to vaporize moisture and any unreacted material therefrom. The product was compounded on cooled rolls with 50 per cent of its weight of carbon black, 10 per cent of zinc oxide, 3 per cent of sulphur, 2 per cent of pine tar, 2 per cent of rosin, and 0.1 per cent of mercapto-benzothiazole, rolled into a sheet, and cured by heating under pressure to 148° C. for 20 minutes. Standard test strips were cut from the sheet and were used in determining the tensile strength, the per cent ultimate elongation, and the Shore durometer hardness of the product. The procedure followed in determining the tensile strength and per cent elongation characteristics is given in A. S. T. M. D-412-39T. The emulsifying agents tested in the various runs were Santomerse No. 3 (an alkali metal salt of dodecyl-benzene sulphonic acid), Aquarex D (the monosodium sulphate esters of a mixture of higher fatty alcohols consisting principally of lauryl and myristic alcohols), Nacolene F (an alkyl-aryl sulphonate), Ultrawet (the sodium sulphonates of petroleum hydrocarbons having an average of about 16 carbon atoms in the molecule), Ultroil (sulphated castor oil), Alkanol HG (a sodium alkylnaphthalene sulphonate), and the sulphates of long chain alcohols which sulphate esters are marketed under the names of Duponol 80 and Duponol OS. Table I names the emulsifiers used in each experiment and gives the proportion of each as per cent by weight in the aqueous solution thereof, states the time of reaction and the yield of the devolatilized copolymer product as per cent of the combined weight of the polymerizable starting materials and gives the tensile strength, the per cent ultimate elongation and the Shore durometer hardness of each compounded and cured product.

Runs 1 and 2 of the table describe experiments carried out in accordance with the invention and illustrate the fact that the relative proportions of the several essential emulsifying agents may be varied considerably without seriously reducing the rate of reaction or impairing the quality of the product. It will be noted that the results obtained in runs 1 and 2 are far superior to those in runs 3–13, which latter runs were carried out using emulsifying agents or mixtures of emulsifying agents other than those required by the invention. For instance, although the yields were good in runs 4–6 and 9–11, the products in these instances were too hard or brittle to be satisfactory for most purposes, e. g. in making hose. In runs 3, 7–8 and 12–13 the polymerization reaction occurred sluggishly and the yields were unsatisfactory. It may also be mentioned that in run 4 the entire reaction mixture was converted by the reaction into a rubber-like mass which was removed only with difficulty from the reactor. This phenomena has often been encountered when using emulsifying agents other than those required by the present invention, but has never occurred when operating in accordance with the invention, i. e. when practicing the invention the polymer remains for the most part in a liquid emulsion at the end of the reaction, although a portion of the copolymer sometimes coagulates as a button which is readily removed from the reactor.

EXAMPLE 2

In each of two experiments 4 parts by weight of a mixture consisting of 40 per cent by weight of butadiene-1.3 and 60 per cent of methyl isopropenyl ketone was added to an aqueous solution containing the emulsifying agents stated in Table II in the percentages by weight given and which aqueous solution also contained 0.15 per cent by weight of potassium persulphate and sufficient sodium bicarbonate to give the entire reaction mixture a pH value between 8 and 9. The mixture was agitated to effect emulsification and was heated in a closed container with moderate stirring at 60° C. for 16 hours. The copolymer product was recovered, devolatilized, compounded, cured, and the properties of the cured product were determined as in Example 1. Table II names the emulsifying agents employed and gives the percent of each in the aqueous solution thereof. It also gives the yield of the devolatilized product and tensile strength, per cent ultimate elongation and the Shore durometer hardness of the cured product.

*Table I*

| Run No. | Emulsifier | | Reaction period, hours | Yield, percent | Properties of cured product | | |
|---|---|---|---|---|---|---|---|
| | Kind | Percent | | | Tensile strength, lbs./sq. in. | Elongation, percent | Hardness |
| 1 | Aquarex<br>Santomerse-3<br>Aliphatic ester sulphate | 0.65<br>0.65<br>0.35 | 16 | 94 | 2,620 | 310 | 75 |
| 2 | Aquarex<br>Santomerse-3<br>Aliphatic ester sulphate | 0.85<br>0.85<br>0.45 | 7 | 88 | 2,810 | 390 | 75 |
| 3 | Aliphatic ester sulphate | 3.0 | 7 | 9.5 | Not tested | | |
| 4 | Aquarex | 2.0 | 20 | 100 | 2,490 | 200 | 88 |
| 5 | Santomerse-3 | 2.0 | 20 | 98 | 2,290 | 190 | 88 |
| 6 | Aquarex<br>Santomerse-3 | 1.0<br>1.0 | 20 | 100 | 1,810 | 130 | 86 |
| 7 | Ultrawet | 3.0 | 20 | 31 | Not tested | | |
| 8 | Duponol-80 | 3.0 | 20 | 63 | 2,620 | 260 | 84 |
| 9 | Ultroil | 3.0 | 72 | 90 | 2,700 | 270 | 85 |
| 10 | Nacrolene F | 3.0 | 72 | 88 | 2,660 | 220 | 86 |
| 11 | Aliphatic ester sulphate | 3.0 | 72 | 88 | Too brittle for testing | | |
| 12 | Alkanol HG | 3.0 | 72 | 78 | 3,000 | 370 | 74 |
| 13 | Duponol OS | 3.0 | 72 | 63 | 3,090 | 400 | 74 |

Table II

| Run No. | Emulsifier | | Yield, percent | Properties of cured product | | |
|---|---|---|---|---|---|---|
| | Kind | Percent | | Tensile strength, lbs./sq. in. | Elongation, percent | Hardness |
| 1 | Aquarex<br>Santomerse<br>Aliphatic ester sulphate | 0.85<br>0.85<br>0.45 | 98 | 2,415 | 380 | 80 |
| 2 | Aquarex<br>Santomerse | 1<br>1 | 98 | 2,330 | 290 | 86 |

EXAMPLE 3

In each of a series of experiments 4 parts by weight of a mixture of butadiene-1.3, methyl isopropenyl ketone and styrene was added to 5 parts of an aqueous solution containing the emulsifying agent stated in Table III in the proportions given and also containing 0.15 per cent by weight of potassium persulphate and sufficient sodium bicarbonate to give the mixture a pH value of 8–9. The mixture was agitated in a closed container to effect emulsification and was heated with stirring in the container to 60° C. for the time stated. Thereafter the polymeric product was recovered, devolatilized, compounded, cured, and the properties of the cured product were determined as in Example 1. Table III gives the proportion of each polymerizable starting material as per cent of the total weight of the polymerizable compounds. It also names the emulsifying agents used and gives the per cent by weight of each in the aqueous solution thereof. The table gives the per cent yield of the devolatilized product and the tensile strength, per cent ultimate elongation and the Shore durometer hardness of the compounded and cured product.

method herein disclosed, provided the step or steps stated by any of the following claims or the equivalent of such stated step or steps be employed.

I, therefore, particularly point out and distinctly claim as my invention:

1. In a method wherein a mixture of polymerizable organic compounds comprising a conjugated diolefin and an unsaturated ketone having the general formula:

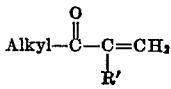

wherein R' represents a member of the group consisting of hydrogen and the methyl radical, is polymerized in aqueous emulsion to form a rubber-like product, the improvements which consist in carrying the polymerization out in an aqueous medium which contains, as agents for effecting emulsification, between 1 and 4 per cent of a mixture of emulsifying agents consisting of between 1.4 and 3 parts by weight of monosodium sulphate esters of a mixture of higher aliphatic alcohols consisting principally of lauryl

Table III

| Run No. | Polymerizable compounds | | | Emulsifier | | Reaction period, hours | Yield, percent | Properties of cured product | | |
|---|---|---|---|---|---|---|---|---|---|---|
| | Butadiene, percent | Methyl isopropenyl ketone, percent | Styrene, percent | Kind | percent | | | Tensile strength, lbs./sq. in. | Elongation, percent | Hardness |
| 1 | 45 | 50 | 5 | Aquarex<br>Santomerse<br>Aliphatic ester sulphate | 0.85<br>0.85<br>0.45 | 20 | 91 | 2,930 | 380 | 75 |
| 2 | 45 | 50 | 5 | Aquarex<br>Santomerse | 1.0<br>1.0 | 20 | 100 | 2,290 | 340 | 86 |
| 3 | 38 | 42 | 20 | Aquarex<br>Santomerse<br>Aliphatic ester sulphate | 0.85<br>0.85<br>0.45 | 7.5 | 100 | 2,050 | 370 | 74 |
| 4 | 38 | 42 | 20 | Aquarex<br>Santomerse | 1.0<br>1.0 | 20 | 96 | 2,250 | 350 | 90 |

In addition to the foregoing detailed examples, I have found that the mixture of emulsifying agents and the persulphate catalyst required by the invention may advantageously be used in copolymerizing in aqueous emulsion mixtures of conjugated diolefins and unsaturated ketones with other polymerizable organic compounds. Examples of such other polymerizable mixtures which have been polymerized with advantage by the present method are mixtures of butadiene, methyl isopropenyl ketone and alpha-methyl-styrene; mixtures of butadiene, methyl isopropenyl ketone and para-methyl-alpha-methyl-styrene; and mixtures of butadiene, methyl isopropenyl ketone and vinyl bromide. In all of these instances soft rubber-like products of good quality were obtained in excellent yield.

Other modes of applying the principle of the invention may be employed instead of those explained, change being made as regards the and myristic alcohols, between 1.4 and 3 parts of an alkali metal salt of dodecyl benzene sulphonic acid, and one part of another emulsifying agent selected from the class consisting of sulphuric acid esters of higher aliphatic alcohols and the alkali salts of such esters, and which aqueous medium also contains a catalytic amount of a water-soluble persulphate and sufficient alkali to render the reaction mixture alkaline.

2. In a method wherein a rubber-like copolymer is formed by polymerizing in aqueous emulsion a mixture of polymerizable organic compounds comprising between 35 and 60 per cent of a conjugated diolefin and between 5 and 60 per cent of an unsaturated ketone having the general formula:

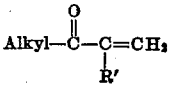

wherein R' represents a member of the group consisting of hydrogen and the methyl radical, the improvements which consist in carrying the polymerization out in an aqueous medium which contains, as agents for effecting emulsification, between 1 and 4 per cent of a mixture of emulsifying agents consisting of between 1.4 and 3 parts of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifying agent selected from the class consisting of sulphuric acid esters of higher aliphatic alcohols and the alkali salts of such esters, and which aqueous medium also contains a catalytic amount of a water-soluble persulphate and sufficient alkali to render the reaction mixture alkaline.

3. In a method wherein a rubber-like copolymer is formed by polymerizing in aqueous emulsion a mixture of polymerizable organic compounds comprising between 35 and 60 per cent of a conjugated diolefin and between 5 and 60 per cent of an unsaturated ketone having the general formula:

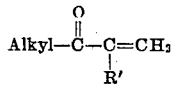

wherein R' represents a member of the group consisting of hydrogen and the methyl radical, the improvements which consist in carrying the polymerization out in an aqueous medium which contains, as agents for effecting emulsification, between 1 and 4 per cent of a mixture of emulsifying agents consisting of between 1.4 and 3 parts by weight of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifier selected from the class consisting of sulphuric acid esters of higher aliphatic alcohols and the alkali salts of such esters, and which aqueous medium also contains between about 0.1 and about 0.2 per cent by weight of an alkali persulphate and sufficient alkali to give the reaction mixture a pH value between 7 and 12.

4. In a method wherein a rubber-like copolymer is formed by polymerizing in aqueous emulsion a mixture of polymerizable organic compounds consisting of between 35 and 60 per cent of a conjugated diolefin and between 5 and 60 per cent of an unsaturated ketone having the general formula:

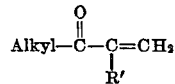

wherein R' represents a member of the group consisting of hydrogen and the methyl radical, and between 5 and 25 per cent of a polymerizable monovinyl compound selected from the group consisting of vinyl aromatic compounds, vinyl cyanide, and vinyl halides, the improvements which consist in carrying the polymerization out in an aqueous medium which contains, as the agents for effecting emulsification, between 1 and 4 per cent of a mixture of emulsifying agents consisting of between 1.4 and 3 parts by weight of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifier selected from the class consisting of sulphuric acid esters of higher aliphatic alcohols and the alkali salts of such esters, and which aqueous medium also contains between about 0.1 and about 0.2 per cent by weight of an alkali persulphate and sufficient alkali to give the reaction mixture a pH value between 7 and 12.

5. In a method wherein a rubber-like copolymer is formed by polymerizing in aqueous emulsion a mixture of polymerizable organic compounds comprising between 35 and 60 per cent of butadiene-1.3 and between 5 and 60 per cent of methyl isopropenyl ketone, the improvements which consist in carrying the polymerization out in an aqueous medium which contains as the agents for effecting emulsification between 1 and 4 per cent of a mixture of emulsifying agents consisting of between 1.4 and 3 parts by weight of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifier selected from the class consisting of sulphuric acid esters of higher aliphatic alcohols and the alkali salts of such esters, and which aqueous medium also contains between about 0.1 and about 0.2 per cent by weight of an alkali persulphate and sufficient alkali to give the reaction mixture a pH value between 7 and 12.

6. In a method wherein a rubber-like copolymer is formed by polymerizing in aqueous emulsion a mixture of polymerizable organic compounds consisting of butadiene-1.3, methyl isopropenyl ketone and between 5 and 35 per cent of vinyl cyanide, the improvements which consist in carrying the polymerization out in an aqueous medium which contains as the agents for effecting emulsification between 1 and 4 per cent of a mixture of emulsifying agents consisting of between 1.4 and 3 parts by weight of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifier selected from the class consisting of sulphuric acid esters of higher aliphatic alcohols and the alkali salts of such esters, and which aqueous medium also contains between about 0.1 and about 0.2 per cent by weight of an alkali persulphate and sufficient alkali to give the reaction mixture a pH value between 7 and 12.

7. In a method wherein a rubber-like copolymer is formed by polymerizing in aqueous emulsion a mixture of polymerizable organic compounds consisting of between 35 and 60 per cent of butadiene-1.3, between 5 and 60 per cent of methyl isopropenyl ketone, and between 5 and 35 per cent of a vinyl aromatic compound, the improvements which consist in carrying the polymerization out in an aqueous medium which contains as the agents for effecting emulsification between 1 and 4 per cent of a mixture of emulsifying agents consisting of between 1.4 and 3 parts by weight of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifier selected from the class consisting of sulphuric acid esters of higher aliphatic alcohols and the alkali salts of such esters, and which aqueous medium also contains between about 0.1 and about 0.2 per cent by weight of an alkali persulphate and sufficient alkali to give the reaction mixture a pH value between 7 and 12.

8. In a method wherein a rubber-like copolymer is formed by polymerizing in aqueous emulsion a mixture of polymerizable organic compounds consisting of between 35 and 60 per cent of butadiene-1.3, between 5 and 60 per cent of methyl isopropenyl ketone, and between 5 and 35 per cent of styrene, the improvements which consist in carrying the polymerization out in an aqueous medium which contains as the agents for effecting emulsification between 1 and 4 per cent of a mixture of emulsifying agents consisting of between 1.4 and 3 parts by weight of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifier selected from the class consisting of sulphuric acid esters of higher aliphatic alcohols and the alkali salts of such esters, and which aqueous medium also contains between about 0.1 and about 0.2 per cent by weight of an alkali persulphate and sufficient alkali to give the reaction mixture a pH value between 7 and 12.

9. In a method wherein a rubber-like copolymer is formed by polymerizing in aqueous emulsion a mixture of polymerizable organic compounds consisting of between 35 and 60 per cent of butadiene-1.3, between 5 and 60 per cent of methyl isopropenyl ketone and between 5 and 35 per cent of a vinyl halide, the improvements which consist in carrying the polymerization out in an aqueous medium which contains as the agents for effecting emulsification between 1 and 4 per cent of a mixture of emulsifying agents consisting of between 1.4 and 3 parts by weight of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifier selected from the class consisting of sulphuric acid esters of higher aliphatic alcohols and the alkali salts of such esters, and which aqueous medium also contains between about 0.1 and about 0.2 per cent by weight of an alkali persulphate and sufficient alkali to give the reaction mixture a pH value between 7 and 12.

10. An aqueous solution suitable for use as an emulsifying medium for the copolymerization of mixtures of polymerizable organic compounds comprising conjugated diolefin and an unsaturated ketone having the general formula:

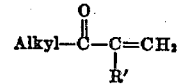

wherein R' represents a member of the group consisting of hydrogen and the methyl radical, to form rubber-like products, which aqueous solution contains between 1 and 4 per cent of a mixture of emulsifying agents consisting of between 1.4 and 3 parts by weight of mono-sodium sulphate esters of a mixture of higher aliphatic alcohols consisting principally of lauryl and myristic alcohols, between 1.4 and 3 parts of an alkali metal salt of dodecyl benzene sulphonic acid, and one part of another emulsifier selected from the class consisting of sulphuric acid esters of higher aliphatic alcohols and the alkali salts of such esters, and sufficient alkali to give the reaction mixture a pH value between 7 and 12.

ROBERT R. DREISBACH.